(12) United States Patent
Tan et al.

(10) Patent No.: US 8,239,732 B2
(45) Date of Patent: Aug. 7, 2012

(54) ERROR CORRECTION CODING IN FLASH MEMORY DEVICES

(75) Inventors: Tat Hin Tan, Penang (MY); Ed Bautista, Sunnyvale, CA (US); Bryan W. Hancock, Los Altos, CA (US); Jackson Huang, San Jose, CA (US); Allan Parker, Austin, TX (US)

(73) Assignee: Spansion LLC, Sunnyvale, CA (US)

( * ) Notice: Subject to any disclaimer, the term of this patent is extended or adjusted under 35 U.S.C. 154(b) by 1055 days.

(21) Appl. No.: 11/928,434

(22) Filed: Oct. 30, 2007

(65) Prior Publication Data
US 2009/0113272 A1   Apr. 30, 2009

(51) Int. Cl.
*G11C 29/00* (2006.01)
(52) U.S. Cl. .......... 714/765; 714/763; 714/764
(58) Field of Classification Search ........... 714/763–765
See application file for complete search history.

(56) References Cited

U.S. PATENT DOCUMENTS

| | | | |
|---|---|---|---|
| 7,617,437 B2 * | 11/2009 | Moyer ......................... 714/763 |
| 2005/0283650 A1 * | 12/2005 | Zhang et al. ...................... 714/6 |
| 2006/0239450 A1 * | 10/2006 | Holtzman et al. .............. 380/28 |
| 2008/0109899 A1 * | 5/2008 | Rijnswou Van et al. ........ 726/21 |

* cited by examiner

*Primary Examiner* — Sam Rizk
(74) *Attorney, Agent, or Firm* — Turocy & Watson, LLP

(57) ABSTRACT

Systems and/or methods that facilitate error correction of data are presented. An error correction code (ECC) control component facilitates enabling or disabling error correction of data being written to or read from memory, such as flash memory, based on ECC indicator data associated with a piece of data. The ECC control component can analyze data, parity code, and/or indicator data associated with the incoming data and/or data stored in the memory location where the incoming data is to be written to determine whether parity code can be written for the incoming data and/or whether error correction can be enabled with respect to the incoming data. Error correction can be enabled when an indicator bit associated with the data is unprogrammed (e.g., bit set to '1' state) and can be disabled by programming the indicator bit (e.g., bit set to '0' state).

20 Claims, 12 Drawing Sheets

ERROR CORRECTION CODING IN FLASH MEMORY DEVICES

TECHNICAL FIELD

The present invention relates generally to memory systems and in particular to systems and methods for implementing error correction in a memory device.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

NOR flash memory includes certain features which can make it desirable to users (e.g., consumers). NOR flash memory can facilitate fast random access reads and can generally allow programming granularity down to the byte/word level. As memory devices, including NOR flash devices, approach gigabit densities, memory devices can become more susceptible to errors, such as, for example, errors due to single-bit charge loss. A common way of improving the reliability of memory devices can be to extend the storage area of a memory device at the cost of efficiency in order to store error correction code (ECC), which can be utilized to facilitate correcting errors.

However, unlike in certain non-volatile devices, in NOR flash memory devices it is not possible to revert to a '1' after a bit has been programmed to '0'. As a result, ECC can be difficult to implement in flash devices, particularly flash memory devices that include NOR flash memory. For instance, virtually every time the data in a memory location is updated, in order to have valid ECC, a new set of ECC would have to be rewritten based on the updated data, and almost invariably, a '0' will have to be converted into '1', which is not possible with a NOR flash device. Yet, ECC techniques have begun to be employed in flash memory devices.

For example, ECC has been employed in NAND flash devices, which typically can be less robust for data storage retention, in order to cope with charge loss/gain mechanism. NAND applications, typically for mass storage, require data to be programmed in huge chunks (e.g., $\geq 512$ bits) at a time. However, implementing ECC in a NOR flash device in a manner similar to that of NAND devices can be problematic as such an ECC implementation can result in the writing mechanism being unduly restrictive, random access read speeds being severely degraded, and further, much of the legacy software having to be rewritten to accommodate such ECC techniques. As a result, conventional ECC techniques are not desirable, as such drawbacks can result in the NOR flash memory device being less desirable to users, such as consumers.

It is desirable to be able to implement error correction in NOR flash memory devices while preserving the advantages of NOR flash memory devices, such as the flexibility of byte/word programming, overwriting/updating, and fast random access read speeds, as well as enabling users to maintain the use of legacy software.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate error correction in memory devices (e.g., NOR flash memory devices). In accordance with one aspect of the disclosed subject matter, an error correction code (ECC) control component can be employed to facilitate determining whether error correction can be enabled or disabled with regard to data being written to a memory location in the memory. In accordance with one aspect of the disclosed subject matter, the ECC control component can employ an indicator bit(s) that can be associated with a set of data and can be set at a certain value (e.g., remain unprogrammed at a value of '1' in a flash memory device) to indicate that error correction is enabled with regard to the data associated therewith, and set to another value (e.g. programmed to a value of '0' in a flash memory device) to indicate that error correction is disabled with regard to such associated data. The ECC control component can analyze whether the indicator bit is programmed or unprogrammed to facilitate determining whether error correction is enabled or disabled, respectively.

In accordance with another aspect of the disclosed subject matter, a program component can employ write buffer programming to program chunks of data to a memory location in the memory. The ECC control component can read and analyze data, parity bit information, and indicator bit information associated with the memory location, or a portion thereof, to determine whether a new parity code (e.g., ECC) can be written to facilitate error detection and correction with regard to the data being written to memory as well as the with regard to data currently stored in the memory location. For example, a memory location can have four words of data stored therein, although the memory location is able to store more than four words (e.g., eight words, sixteen words, ...) of data. The ECC control component can read the data stored in the memory location as well as associated parity bit information and indicator bit information to determine whether a parity code can be written for data being written to the available portion of the memory location as well as the data stored in a portion of the memory location. If it is determined that a new parity code cannot be written, such as where the parity bits read by the ECC control component indicate that one or more parity bits have a value of '0', the ECC control component can disable the ECC protection by programming the indicator bit (e.g., programming the indicator bit to '0'). If it is determined that a new parity code can be written for the memory location, such as where the parity bits read from the memory location are all set to '1', and, if the associated indicator bit is unprogrammed (e.g., set to '1'), the ECC control component can facilitate enabling error protection as the indicator bit can be left unprogrammed. Parity code can then be generated to facilitate error detection/correction of all data being stored in the memory location (e.g., data being written to memory location and data currently stored in the memory location).

In accordance with another aspect of the disclosed subject matter, a word/byte component can facilitate programming of smaller numbers of bits (e.g., 8 bits, 16 bits, etc.) into a memory location, for example, to overwrite data in the memory location. As programming smaller pieces of data to a memory location in the word/byte mode and/or overwriting data in the memory location can render the parity code associated with the memory location invalid, the ECC control component can facilitate disabling the ECC protection with regard to the data in that memory location, for example, by programming the indicator bit (e.g., program the indicator bit to '0') associated therewith.

In accordance with still another aspect of the disclosed subject matter, the ECC control component can receive information regarding a programming failure related to data being written to a memory location. The ECC control component can analyze information associated with the programming error to determine whether the programming error was due to an error related to the data being written to the memory location or due to an error related to the associated parity code being written to the memory location. If the programming error was only related to the parity code and not the data, the ECC control component can disable the ECC protection, and the data can still be written to the memory location with the ECC protection disabled.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
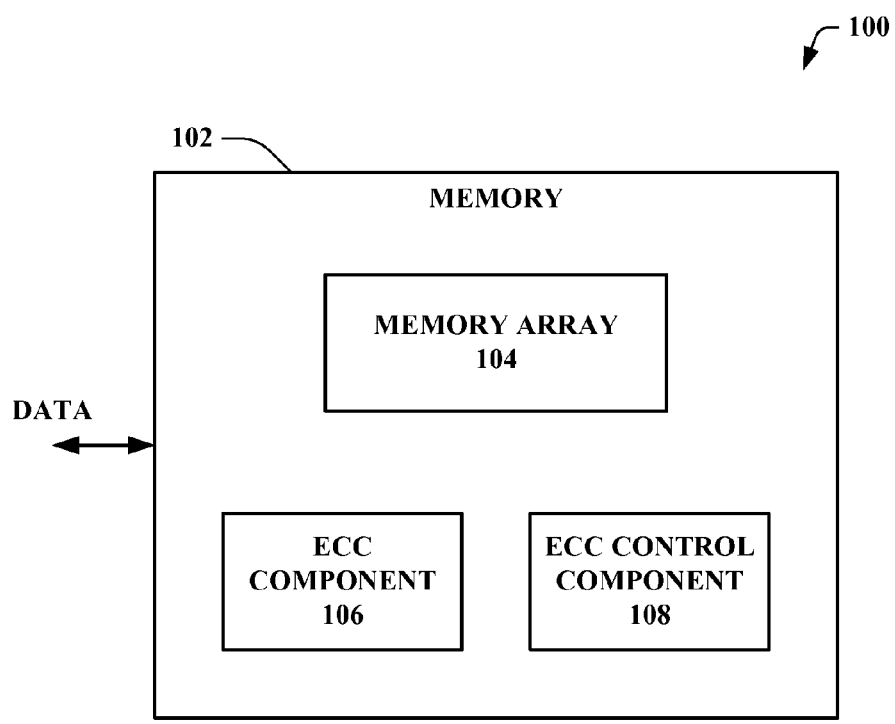
FIG. 1 illustrates a block diagram of a system that facilitates error correction of data in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Conventionally, implementing error correction in NOR flash memory devices can be problematic. NOR flash memory devices have certain advantages in that they can allow fast random access reads and also can facilitate programming granularity down to the word/byte level, as opposed to NAND flash memory devices, which typically can require that data be programmed in large chunks (e.g., $\geq 512$ bits) at a time. While in NOR flash memory devices smaller amounts of data can be programmed at a time, once a bit has been programmed to a '0' the bit cannot be changed to a '1' unless the entire block of bits associated with that bit is erased and all bits in the memory block are set to '1'. Typically for error correction, when data in a memory location is updated, new error correction data is written. However, if data in a memory location is updated, and any of the parity bits are programmed to a '0', then writing new parity code to be associated with the updated data can be an issue. It is desirable to be able to implement error correction in NOR flash memory devices while maintaining the advantages of NOR flash memory.

Systems and/or methods are presented that facilitate error correction in memory devices (e.g., NOR flash memory devices). The memory can include an error correction code (ECC) control component that, during a write operation, can facilitate enabling error correction of data when parity code can be written for a piece of data being written to the memory and can facilitate disabling error correction of a piece of data when, for example, parity code cannot be written (e.g., parity code is stored in the desired memory location), the parity code is no longer valid, and/or the parity code is subject to a programming error, with respect to the piece of data. During a read operation, the ECC control component can facilitate determining whether error correction is enabled or disabled in order to determine whether the data being read from memory can be decoded with error detection and correction being performed or can be decoded without error detection/correction.

Turning to FIG. 1, illustrated is a system 100 that facilitates error correction of data in accordance with the disclosed subject matter. System 100 can include a memory 102 that can be a non-volatile memory, such as a flash memory device (e.g., single-bit flash memory, multi-bit flash memory). The memory 102 can be comprised of NAND memory and/or NOR memory. The memory 102 can include a memory array 104 that can receive and store data. The memory array 104 can include a plurality of memory cells (not shown) wherein each memory cell can store one or more bits of data. Data stored in a memory cell(s) in the memory array 104 can also be read and such data can be provided as an output.

The memory 102 can also include an ECC component 106 that can facilitate error correction of data associated with the memory 102. The ECC component 106 can employ ECC, such as Hamming code, to facilitate encoding of data being written to a memory location(s) (e.g., memory cell(s)) in the memory array 104 and/or decoding of data being read from a memory location(s) in the memory array 104. For example, the ECC component 106 can facilitate generating parity bits (e.g., redundant data) with a value that can be based on data being written to memory 102. The parity bits can be stored in the memory location with the associated data, or can be stored in a different memory location. The parity bits can be utilized to facilitate error correction of the associated data when the data is read from the memory 102.

In accordance with one embodiment of the disclosed subject matter, Hamming code can be employed to facilitate error correction of data. For data having a length of 128 bits being written to the memory 102, the ECC component 106 can facilitate generating eight parity bits that can be associated with the data. For data having a length of 256 bits being written to the memory 102, the ECC component 106 can facilitate generating nine parity bits that can be associated with the data, for example.

The memory 102 can further include an ECC control component 108 that can facilitate management of error correction of data, for example, by facilitating enabling and/or disabling error correction with regard to a particular set (e.g. chunk) of data. The ECC control component 108 can employ an indicator bit that can be associated with a set of data and can facilitate indicating whether the ECC is enabled or disabled with respect to the set of data. For example, in a flash memory device, the indicator bit can remain unprogrammed in the '1' state to indicate that error correction is enabled with respect to data associated therewith or can be programmed to the '0' state to indicate that error correction is disabled as to such data.

In accordance with one aspect of the disclosed subject matter, during a read operation, the ECC control component 108 can analyze the indicator bit associated with the data being read from a memory location in the memory array 104 to determine whether the indicator bit is set to enable or disable error correction with regard to the data being read. If the indicator bit is set at '1' or unprogrammed, the ECC control component 108 can determine that the error correction is enabled and the associated data can be error corrected by the ECC component 106 using parity information associated therewith and/or otherwise decoded, and the error corrected data can be provided as an output from the memory 102. If the indicator bit is set or programmed to '0', the ECC control component 108 can disable the error correction as to the associated data being read from the memory location. The read data can be provided as an output from the memory 102 without error correction.

In accordance with another aspect of the disclosed subject matter, during write buffer programming of data, such as where data being written to a memory location(s) in the memory 102 can be chunked, for example, into chunks of 128 bits or 256 bits, the ECC control component 108 can facilitate determining whether error correction can be enabled or disabled with regard to the chunk of data being programmed into a memory location(s) (e.g. memory cell(s)) in the memory 102. The memory location can have data that is already stored therein and can also have a portion of the memory space available for programming of data. For example, the memory location may have a small amount of data (e.g., four words) stored therein, but can still have available space where additional data can be programmed. The ECC control component 108 can facilitate reading the data, associated parity information, and indicator bit from such memory location in order to facilitate determining whether the data being written to that memory location can have error correction enabled or disabled. The ECC control component 108 can determine whether any of the read parity bits and/or indicator bit are set to '0' (e.g. for flash memory). If any parity bit or indicator bit is set or programmed to '0', then the ECC control component 108 can determine that a parity code cannot be written for the incoming data being written to memory 102, and can disable the error correction by programming the indicator bit associated with the incoming chunk of data to '0'. The incoming data chunk can be written to the desired memory location(s) in the memory 102 with error correction disabled. If all parity bits and the indicator bit are set to '1', the ECC control component 108 can determine that a parity code can be written and associated with the incoming chunk of data. The ECC component 106 can facilitate generating the parity code for the incoming chunk of data, and the data and associated parity bits can be written to the desired memory location(s) with error correction enabled with regard to such data. To facilitate indicating that error correction is enabled with regard to such data, the indicator bit associated with such data can remain in an unprogrammed state (e.g., the '1' state in a flash memory).

In accordance with still another aspect of the disclosed subject matter, if there is a programming failure of a chunk of data being written to the memory 102, the ECC control component 108 can analyze the programming failure to determine whether the programming error was a result of an error in the programming of the data bits and/or the associated parity bits. If the ECC control component 108 determines that the error is in the programming of the parity bits only, and not the data being written to memory 102, then the ECC control component 108 can facilitate disabling the error correction as to that data and that data can be programmed to the desired memory location with error correction disabled. If the ECC control component 108 determines that the programming error is related to the data being written to the memory 102, the ECC control component 108 can facilitate indicating that the programming cannot be completed for that chunk of data, and the programming of such chunk of data can be aborted and/or the system 100 can hang and provide notice that there was an error in programming of the chunk of data.

In accordance with yet another aspect of the disclosed subject matter, during a write of a small piece of data (e.g., 8 bits, 16 bits), for example, with regard to word/byte programming of data and/or overwriting of data in a desired memory location in the memory 102, the ECC control component 108 can facilitate disabling the error correction, for example, by programming the indicator bit associated with the data to '0', and the data can be written to the desired memory location with error correction disabled.

In accordance with another aspect of the disclosed subject matter, during an erase of a memory location (e.g. memory block) in memory 102, a successful erase of the memory location can result in all bits in the memory location being set to the unprogrammed state of '1'. The ECC control component 108 can analyze the bit of the memory location that can be the indicator bit and can determine that error correction can be enabled with respect to that memory location.

The subject innovation can facilitate error correction of data in flash memory devices, such as NOR flash memory devices, while maintaining certain features that can be desirable in NOR flash memory devices. One desirable feature is that NOR flash memory devices can allow fast random access reads. Another feature of NOR flash memory devices is that they can allow programming granularity down to the byte/word level. For instance, in NOR flash memory devices, word/byte programming of data can be performed to program relatively small pieces of data (e.g., 1 bit, 8 bits, 16 bits, etc.). The ECC control component 108 can facilitate disabling error correction with respect to such pieces of data by programming an indicator bit associated therewith, since the parity information will no longer be valid with regard to all data stored in the memory location where the data is being written. This can facilitate preventing miscorrection of data being read from the memory device. Based on customer feedback and survey, only a negligible amount of the flash storage capacity is actually overwritten or programmed in the word/byte mode. For this reason, disabling error correction when data is overwritten or when data is programmed in the word/byte mode can have minimal impact on overall data integrity or reliability in a flash memory device.

Further, employing an indicator bit to facilitate enabling/disabling error correction can have little impact on the memory capacity as the indicator bit only represents approximately 0.7% of the total capacity with regard to a 128-bit data chunk. Furthermore, the disclosed subject matter can allow the existing write buffer programming command to be utilized while facilitating error correction in NOR flash memory devices, as error correction can be enabled/disabled in accordance with the disclosed subject matter. Moreover, the subject innovation can be implemented in NOR flash memory devices and at the same time can allow users to utilize legacy software without having to rewrite such software to accommodate the features of the subject innovation.

In addition, implementing error correction, for example, by employing ECC (e.g., Hamming code) to facilitate error correction of data in NOR flash memory devices can result in reducing error with regard to data stored and read from such memory devices. There can be minimal impact on bit utilization efficiency of the memory device as bit utilization efficiency is only reduced by approximately 6% when 8 parity bits are employed for a 128-bit data chunk and by approximately 3% when 9 parity bits are employed for a 256-bit data chunk. In addition, by aligning data chunks in sizes of 128 bits or 256 bits (e.g., asynchronous read access), the decoding circuit will not utilize an excessive amount of die area.

Figure 2:
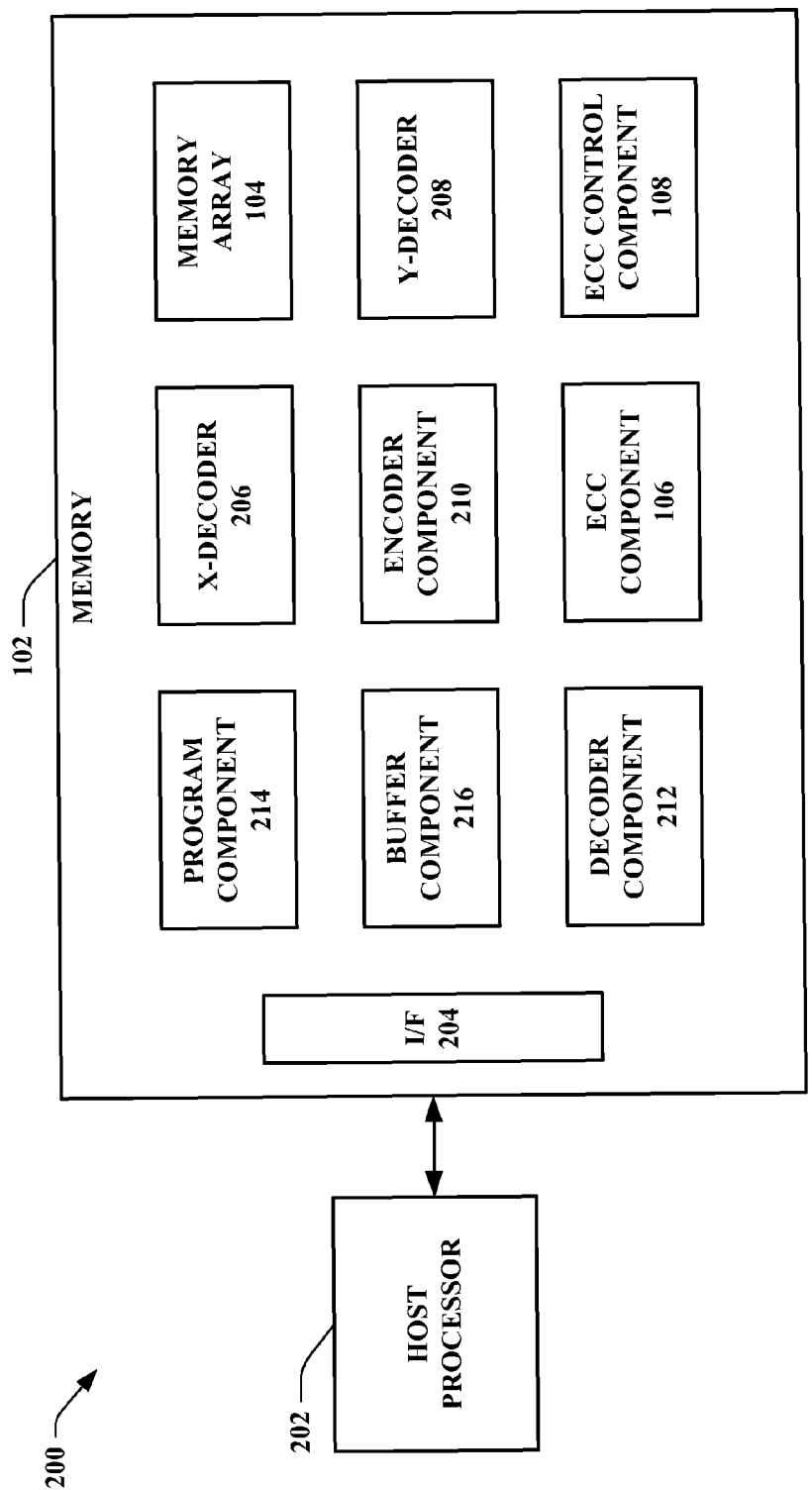
FIG. 2 depicts a block diagram of another system that facilitates error correction of data in accordance with an aspect of the disclosed subject matter.

Referring to FIG. 2, depicted is a block diagram of another system 200 that can facilitate error correction of data in accordance with the disclosed subject matter. System 200 can include a memory 102 that can be a non-volatile memory such as a flash memory (e.g. single-bit flash memory, multi-bit flash memory). The memory 102 can be comprised of NOR flash memory and/or NAND flash memory, for example. The memory 102 can include a memory array 104 that can be comprised of a plurality of memory cells (not shown) wherein data can be stored, as more fully described infra.

The memory 102 can further include an ECC component 106 that can facilitate error correction of data, for example, by generating parity code (e.g., ECC) based on a piece of data and using the parity code to detect and/or correct the piece of data. For instance, the parity code can be based on Hamming code. Memory component 102 also can contain an ECC control component 108 that can facilitate error correction of data in the memory 102 by controlling (e.g., enabling, disabling) error correction associated with a piece of data based on the state of an indicator bit associated with the piece of data, the state of the parity code associated with the piece of data, and/or the type of operation (e.g., program, word/byte program, erase) being performed with respect to the piece of data. It is to be appreciated that the memory 102, memory array 104, ECC component 106, and ECC control component 108 can each include their respective functionality, as more fully described herein, for example, with regard to system 100.

System 200 can also include a host processor 202 that can be associated with the memory 102. In accordance with an embodiment of the disclosed subject matter, the host processor 202 can be a typical applications processor that can manage communications and run applications. For example, the host processor 202 can be a processor that can be utilized by a computer, a mobile handset, personal data assistant (PDA), or other electronic device. The host processor 202 can generate commands, including read, write, and/or erase commands, in order to facilitate reading data from, writing data to, and/or erasing data from the memory 102, where the communication of information between the host processor 202 and the memory 102 can be facilitated via an interface component 204 (hereinafter also referred to as "I/F 204").

I/F 204 can include and/or provide various adapters, connectors, channels, communication paths, etc. to integrate the memory 102 into virtually any operating and/or database system(s) and/or with one another system(s). In addition, I/F 204 can provide various adapters, connectors, channels, communication paths, etc., that can provide for interaction and/or communication with the host processor 202, and/or any other component, data, and the like, associated with the system 200.

The memory 102 can include an X-decoder component 206 and a Y-decoder component 208 that can be associated with the memory array 104 and can each respectively decode inputs/outputs during various operations (e.g., programming, reading, verifying, erasing) that can be performed on the memory cells (not shown), as more fully described infra. For example, the X-decoder component 206 and Y-decoder component 208 can each receive address bus information, which can be provided as part of a command from the host processor 202 or a command from a memory controller component (not shown) within the memory 102, and such information can be utilized to facilitate determining the desired memory location in the memory 102.

The memory 102 can also contain an encoder component 210 that can facilitate encoding data being programmed to the memory 102. For example, the encoder component 210 can facilitate converting a digital signal to an analog signal (e.g., current level) to facilitate programming data in the memory locations (e.g. memory cells) in the memory 102. The encoder component 210 can also be associated with the ECC component 106 to facilitate generating parity code that can be associated with a piece of data being programmed into the memory 102 to facilitate error correction of the piece of data when error correction is enabled, for example, when the piece of data is read from the memory 102.

The memory 102 can further include a decoder component 212 that can facilitate decoding data being read from the memory 102. The decoder component 212 can receive an analog signal associated with data, where the analog signal can be stored in the memory location in the memory array 104, and can facilitate converting the analog signal to a digital signal, so that such digital signal representing the read data can be provided to another component (e.g., host processor 202, cryptographic component (as described infra), etc.) for further processing. The decoder component 212 can be associated with the ECC component 106 to facilitate error detection and/or correction of the data being read from memory, where the parity code associated with the data can be employed to facilitate error detection/correction, when error correction is enabled.

The encoder component 210, decoder component 212, and/or ECC component 106 can be associated with the ECC control component 108 that can facilitate enabling and/or disabling error correction with regard to a piece (e.g., chunk, byte, word, bit, etc.) of data. For example, the ECC control component 108 can enable error correction for a chunk of data being written to a memory location in memory 102 where the parity code has not been programmed in that part of the memory location that can store the parity code and/or where the indicator bit associated therewith has not been programmed. The ECC control component 108 can communicate that error detection/correction is enabled for such chunk of data to facilitate generation of parity code that can be associated with the chunk of data and stored in the desired memory location and/or facilitate error detection/correction of the chunk of data when it is read from the memory location in memory 102. Conversely, the ECC control component 108 can facilitate disabling error detection/correction of data when the parity code has already been programmed into the memory location, for example, with respect to other data stored in a portion of that memory location and/or the indicator bit associated therewith has been programmed to indicate that error correction is disabled with respect to that memory location and data stored therein. The ECC control component 108 can communicate that error detection/correction is disabled with regard to the data stored in that memory location to the ECC component 106, encoder component 210, and/or decoder component 212, so that parity code is not written to that memory location, and when reading the data from that memory location, the data can be read without error detection/correction being performed.

The memory 102 also can contain a program component 214 that can facilitate various types of programming operations to write data to the memory 102. In accordance with one aspect of the disclosed subject matter, the program component 214 can operate in a write buffer mode where larger amounts of data can be written to a memory location(s) in the memory 102. The amount of data can range from, for example, 8 words to 256 words, or more. The data can be temporarily stored in a buffer component 216, which can be a memory or storage component (e.g., static random access memory (SRAM)), where data can be aligned into data chunks of 128 bits or 256 bits, for example, where each data chunk can be associated with parity code and/or an indicator bit. It is to be appreciated that the size of the data chunks are example sizes only, and the disclosed subject matter is not so limited, as the size of the data chunk can be modified as desired by a user.

The program component 214 can also operate in word/byte mode such that relatively small amounts of data can be programmed into a memory location(s) in the memory 102. For example, in the word/byte mode, 16 bits or 8 bits of data, for example, can be programmed into the desired memory location in the memory 102. Again, it is to be appreciated that the amount of data is given for purpose of example only, and the disclosed subject matter is not so limited, as the amount of data programmed in the word/byte mode can be virtually any size desired by a user. For example, less than 8 bits of data, more than 16 bits of data, and/or any number of bits of data in between can be programmed in the word/byte mode as well. The word/byte mode can facilitate overwriting of data in a memory location in memory 102 (e.g., flash memory) as well.

Figure 3:
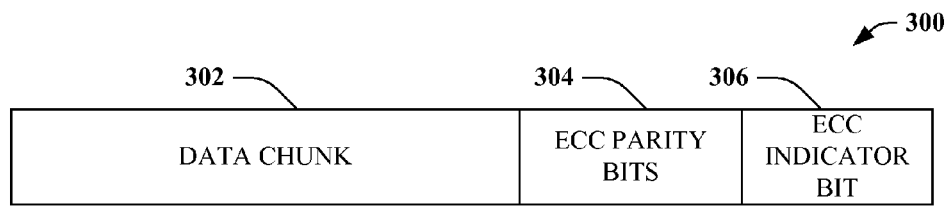
FIG. 3 is a block diagram depicting a data chunk and associated information in accordance with an aspect of the subject matter disclosed herein.

Turning to FIG. 3, illustrated is a block diagram 300 of a data chunk and associated error correction information in accordance with the disclosed subject matter. Block diagram 300 can include a data chunk 302 that can be comprised of bits of data. For example, the data chunk 302 can be comprised of 128 bits of data or 256 bits of data. Data chunk 302 can be associated with parity code 304 (e.g. ECC), which can be comprised of a plurality of parity bits (e.g., 8 parity bits for 128-bit data chunk, 9 parity bits for a 256-bit data chunk) that can be generated based on the bits of data in the data chunk 302. For example, where a data chunk 302 is 128 bits in length, the parity code 304 can be 8 bits; and where a data chunk 302 is 256 bits in length, the parity code 304 can be 9 bits. The parity code 304 can be employed to facilitate error correction of the data chunk 302 when error correction is enabled as to the data chunk 302. The data chunk 302 can also be associated with an ECC indicator bit 306 that can be employed to facilitate determining whether error correction is enabled or disabled with respect to the data chunk 302 associated therewith. For example, if the indicator bit is in an unprogrammed state (e.g., set to '1' for a flash memory device), then error correction can be enabled with respect to the data chunk 302 and the parity code 304 associated with the data chunk 302 can be utilized to facilitate performing error correction of the data chunk 302, for example, when the data chunk 302 is read from the memory (e.g., 102). If, however, the indicator bit is in the programmed state (e.g., set to '0' for a flash memory device), then error correction can be disabled with respect to the data chunk 302, and, during a read operation, the data chunk 302 can be provided without error correction being performed on the data chunk 302.

Figure 4:
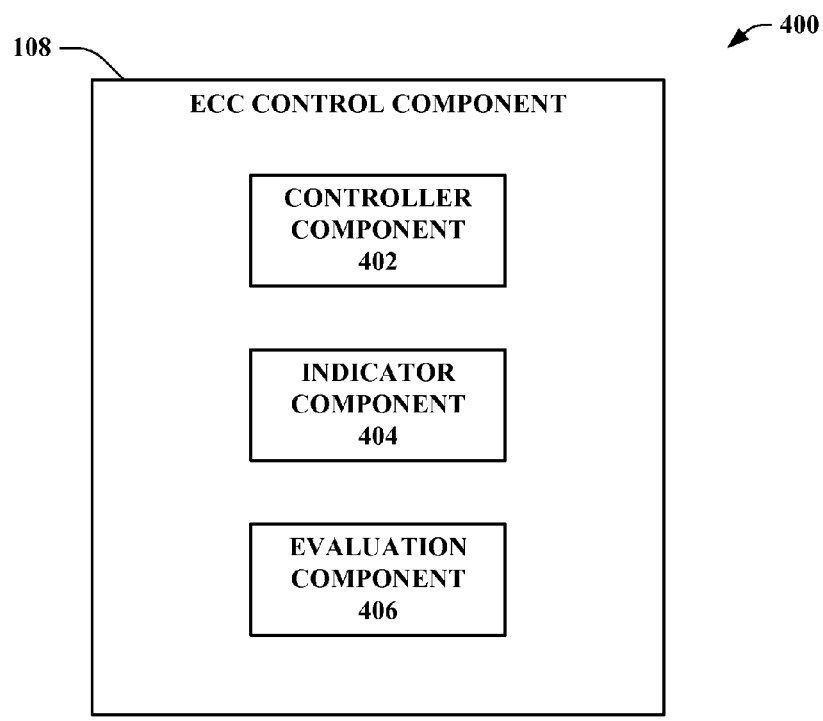
FIG. 4 illustrates a block diagram of a system that facilitates enabling/disabling error correction of data in accordance with the disclosed subject matter.

Referring to FIG. 4, illustrated is a block diagram of a system 400 that can employ an ECC control component to facilitate error correction of data in accordance with the disclosed subject matter. System 400 can include the ECC control component 108, which can include such functionality as more fully described herein, for example, with regard to system 100 and/or system 200. The ECC control component 108 can include a controller component 402 that can facilitate enabling and/or disabling of error correction with respect to a piece of data. The controller component 402 also can facilitate communicating information regarding error detection/correction status to other components (e.g. ECC component 106, encoder component 210, decoder component 212, etc.).

The ECC control component 108 also can include an indicator component 404 that can facilitate designating error detection/correction enabled or disabled with respect to a particular piece of data. For example, the indicator component 404 can facilitate programming an indicator bit associated with a piece of data when it is determined that the error detection/correction is disabled with regard to the piece of data, such as where new parity code cannot be written in a memory location where the piece of data is to be written because parity code was previously stored in that memory location and that previous parity code will no longer be valid and cannot be overwritten due to the nature of flash memory. For instance, the previous parity code can be invalid but cannot be overwritten, for example, where one or more parity bits in the memory location are programmed to '0' and cannot revert to a '1' state without performing an erase on an entire block or sector of the memory 102, where it is not desired to erase the entire block or sector.

The ECC control component 108 can further include an evaluation component 406 that can analyze information, such as data being programmed or read, parity code, and/or indicator data to facilitate determining whether error detection/correction is enabled or disabled with regard to a particular piece of data. For example, the evaluation component 406 can receive and analyze data, parity code, and/or indicator data stored in a memory location in the memory 102, where an incoming piece of data is to be written in order to determine whether error correction can be enabled for the incoming piece of data. The evaluation component 406 can determine whether the indicator bit stored in the memory location has been programmed or not, where if the indicator bit is unprogrammed (e.g., set at '1'), and the parity bits are all unprogrammed (e.g., set at '1'), then the evaluation component 406 can determine that error correction has not been disabled yet and/or a new parity code can be written for the data to be stored in the memory location. If the indicator bit is programmed (e.g. set to '0') and/or a parity code has been programmed to the memory location (e.g., any of the parity bits are set to '0'), the evaluation component 406 can determine that a new parity code cannot be written with respect to the incoming piece of data and/or can determine that error correction is to be disabled with respect to the incoming piece of data.

Figure 5:
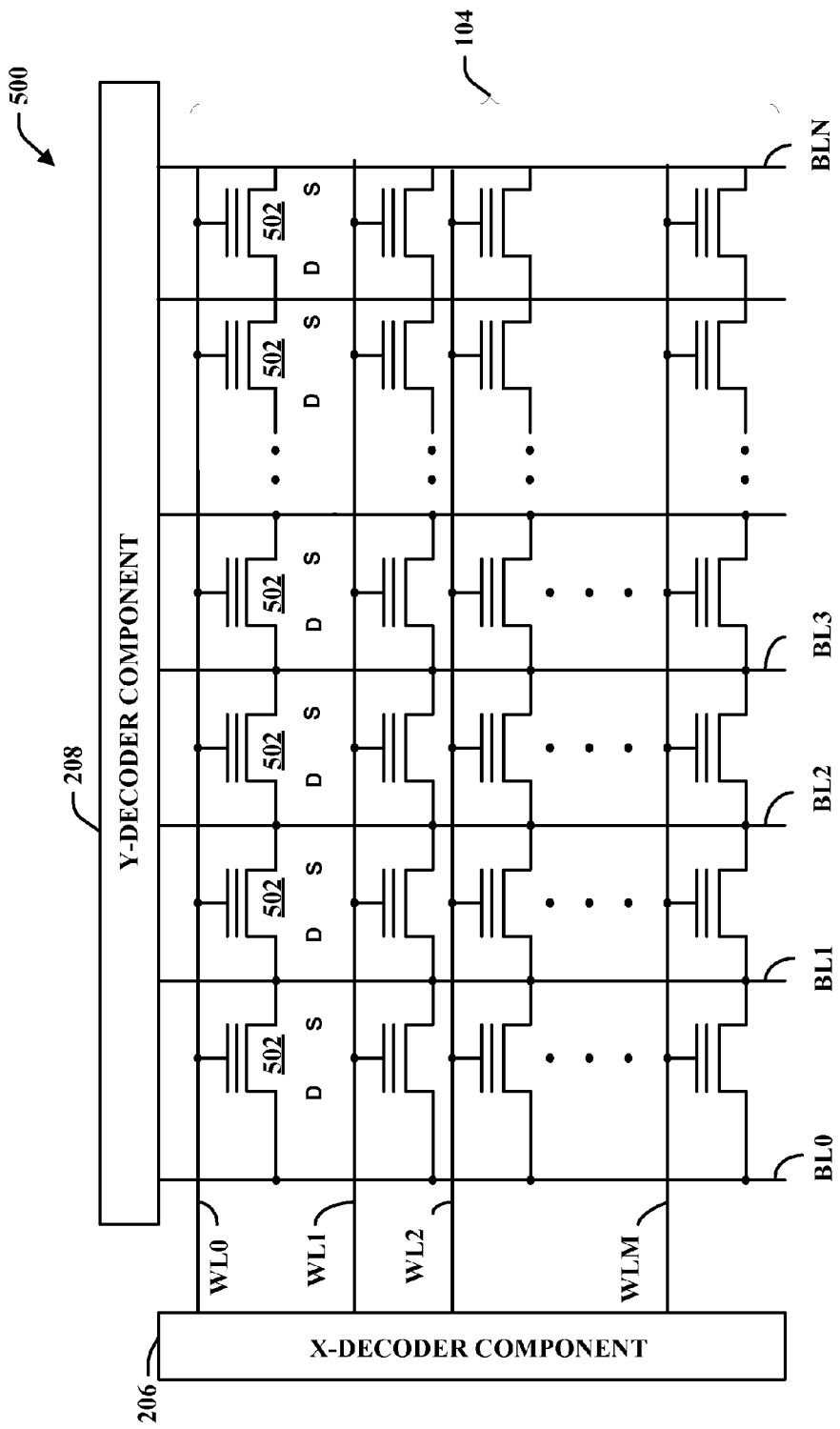
FIG. 5 depicts an example diagram of a memory array in accordance with the disclosed subject matter.

Turning to FIG. 5, depicted is an example diagram 500 of a memory array 104 that can be employed in a memory 102 in accordance with the disclosed subject matter. The diagram 500 of the memory array 104 can include a plurality of memory cells 502 that each can be comprised of a drain, gate, and source. Each memory cell 502 can have one or more levels therein and can thereby store one or more bits of data therein, where each level can be associated with a bit of data. The memory array 104 can be included in a memory 102 (not shown in its entirety). The memory array 104 can be associated with an X-decoder component 206 (e.g. WL decoder) and a Y-decoder component 208 (e.g., BL decoder) that can each respectively decode inputs/outputs during various operations (e.g., programming, reading, verifying, erasing) that can be performed on the memory cells 502. The X-decoder component 206 and Y-decoder component 208 can each receive address bus information from a host processor (e.g., 202) and/or system controller (not shown) or the like, and can utilize such information to facilitate accessing or selecting the desired memory cell(s) (e.g. memory location(s)) associated with the command. The memory cells 502 can be formed in M rows and N columns. A common WL can be attached to the gate of each memory cell 502 in a row, such as word-lines WL0, WL1, WL2, through WLM. A common BL can be attached to each cell 502 in a column, such as bit-lines BL0, BL1, through BLN. A WL can contain, for example, 1024 elements forming multiple words and a sector can include, for example, 512 WLs to provide 512 k elements of memory. In accordance with an aspect of the disclosed subject matter, respective voltages can be applied to one or more cells 502 through the WLs and BLs to facilitate performing operations, such as program, read, erase, and the like.

Figure 6:
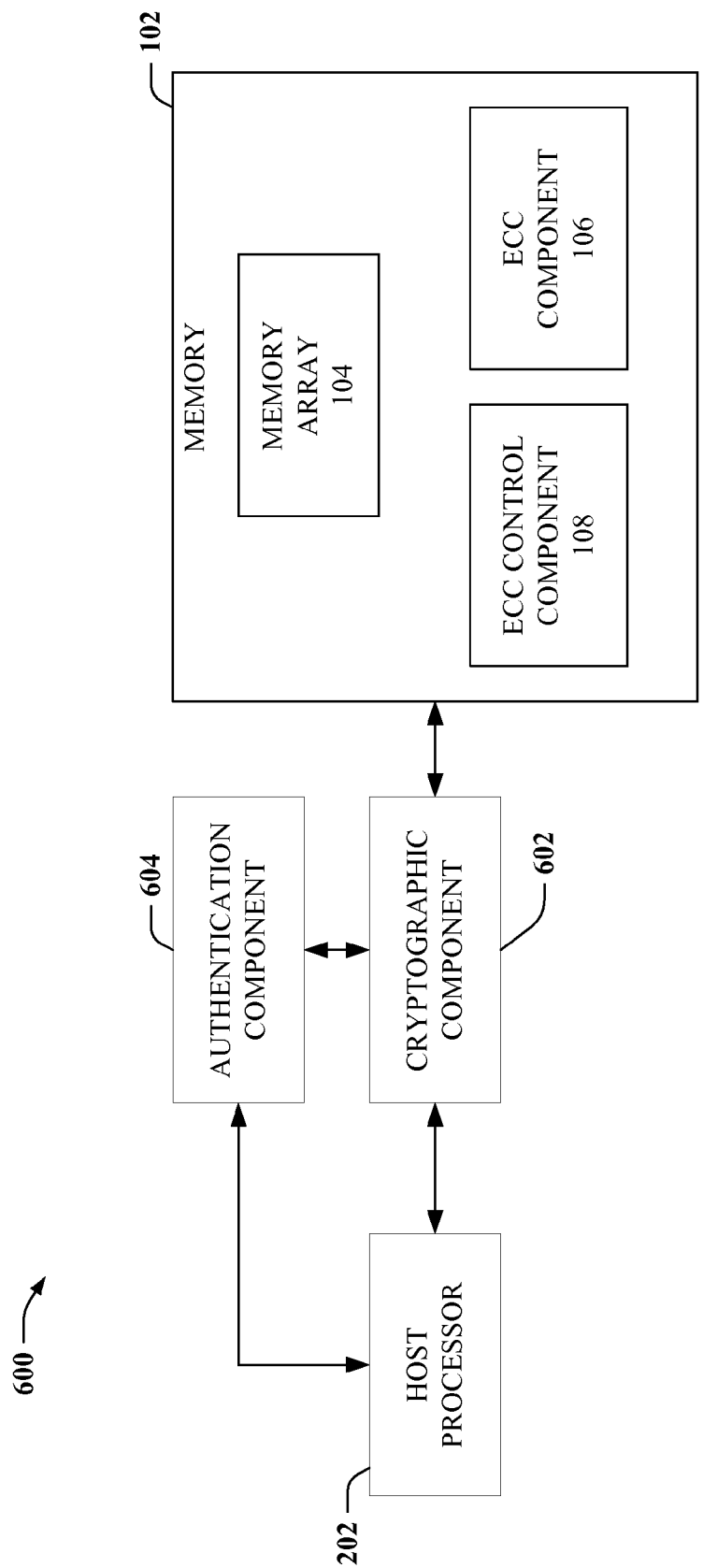
FIG. 6 illustrates a block diagram of a system that facilitates error correction of secure data in accordance with the disclosed subject matter.

Referring to FIG. 6, a block diagram of a system 600 that facilitates error correction of secured data in accordance with the disclosed subject matter is illustrated. System 600 can include a host processor 202 that can be associated with a memory 102, which can be a flash memory device, for example. The memory 102 can include a memory array 104 in which data can be stored, an ECC component 106 that can facilitate error detection/correction of data, and an ECC control component 108 that can facilitate controlling error correction of data. It is to be appreciated that the memory 102, memory array 104, ECC component 106, ECC control component 108, and host processor 202 can each include their respective functionality, as more fully described herein, for example, with regard to system 100, system 200, system 400, and/or system 500.

The host processor 202 can be associated with a cryptographic component 602 that can facilitate encrypting and/or decrypting data to facilitate securing data being written to, stored in, and/or read from the memory 102. In accordance with an aspect of the disclosed subject matter, cryptographic component 602 can provide symmetric cryptographic tools and accelerators (e.g. Twofish, Blowfish, AES, TDES, IDEA, CAST5, RC4, etc.) to ensure that a specified partition in memory component 102, or portions thereof, can only be accessed by those entities authorized and/or authenticated to do so. Cryptographic component 602 can also provide asymmetric cryptographic accelerators and tools (e.g., RSA, Digital Signature Standard (DSS), and the like) to ensure that a specified partition in memory 102, or portions thereof, only can be accessed by those entities that are authorized and certified to do so. Additionally, cryptographic component 602 can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in memory 102 is confined to those entities authorized to gain access.

System 600 can further include an authentication component 604 that can solicit authentication data from an entity, and, upon the authentication data so solicited, can be employed, individually and/or in conjunction with information acquired and ascertained as a result of biometric modalities employed, to facilitate control access to the memory 102. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 604. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 604 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

In accordance with one embodiment of the disclosed subject matter, the memory 102, the cryptographic component 602, and the authentication component 604 can be situated or implemented on a single integrated-circuit chip. In accordance with another embodiment, the memory 102, the cryptographic component 602, and the authentication component 604 can be implemented on an application-specific integrated-circuit (ASIC) chip.

Figure 7:
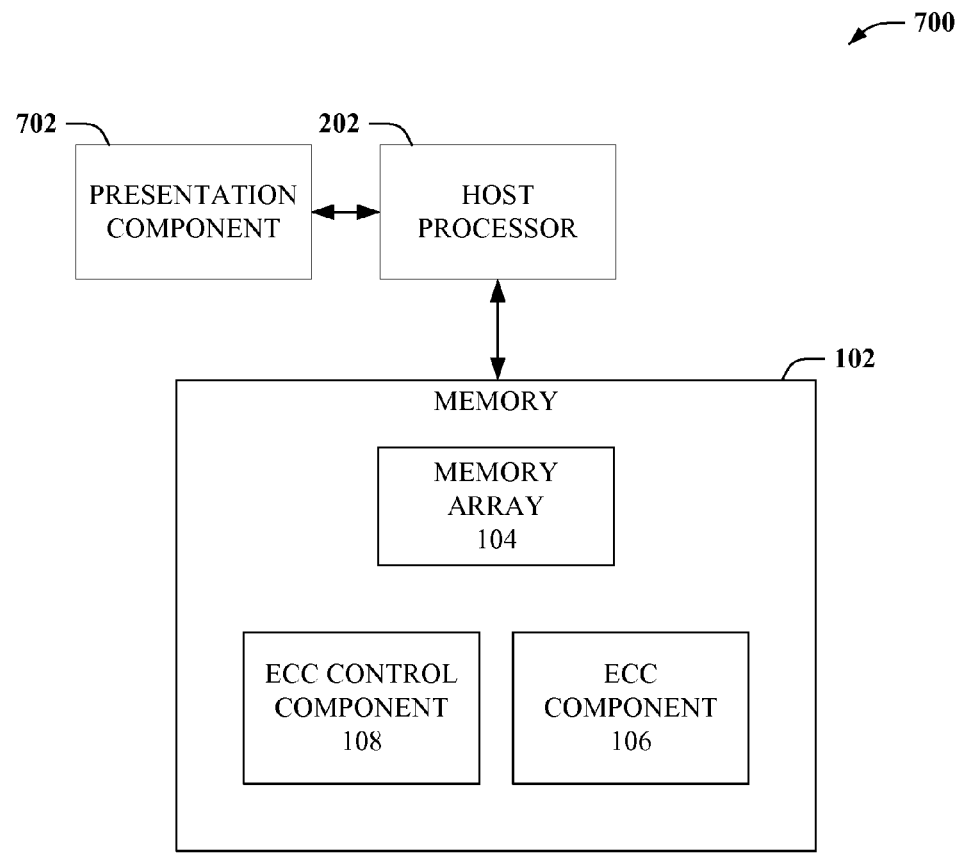
FIG. 7 depicts a block diagram of a system that facilitates error correction of data in accordance with the disclosed subject matter.

Turning to FIG. 7, depicted is a system 700 that can facilitate error correction of data in accordance with the disclosed subject matter. System 700 can include a host processor 202, memory 102 (e.g., flash memory), ECC component 106, and/or ECC control component 108 that each can be substantially similar to respective components and can include such respective functionality as described herein, for example, with regard to system 100, system 200, system 400, system 500, and/or system 600.

System 700 also can include a presentation component 702, which can be associated with the host processor 202. The presentation component 702 can provide various types of user interfaces to facilitate interaction between a user and any component coupled to the host processor 202. As depicted, the presentation component 702 is a separate entity that can be utilized with the host processor 202 and associated components. However, it is to be appreciated that the presentation component 702 and/or similar view components can be incorporated into the host processor 202 and/or a stand-alone unit. The presentation component 702 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 202.

The user can also interact with the regions to select and provide information via various devices such as a mouse, a roller ball, a keypad, a keyboard, a pen and/or voice activation, for example. Typically, a mechanism such as a push button or the enter key on the keyboard can be employed to facilitate entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

System 100, system 200, system 400, system 500, system 600, and/or system 700, or portions thereof, can be employed in virtually any electronic device where security of data is desired. Examples of such electronic devices can include a computer, a cellular phone, a digital phone, a video device (e.g., video playing and/or recording device), a smart card, a personal digital assistant (PDA), a television, an electronic game (e.g. video game), a digital camera, an electronic organizer, an audio player and/or recorder, an electronic device associated with digital rights management, Personal Computer Memory Card International Association (PCMCIA) cards, trusted platform modules (TPMs), an electronic control unit (ECU) associated with a motor vehicle (e.g., ECU associated with fuel injection system), a global positioning satellite (GPS) unit, an electronic device associated with airplanes, an electronic device associated with industrial control systems, Hardware Security Modules (HSMs), set-top boxes, secure memory devices with computational capabilities, devices with tamper-resistant chips, and the like.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
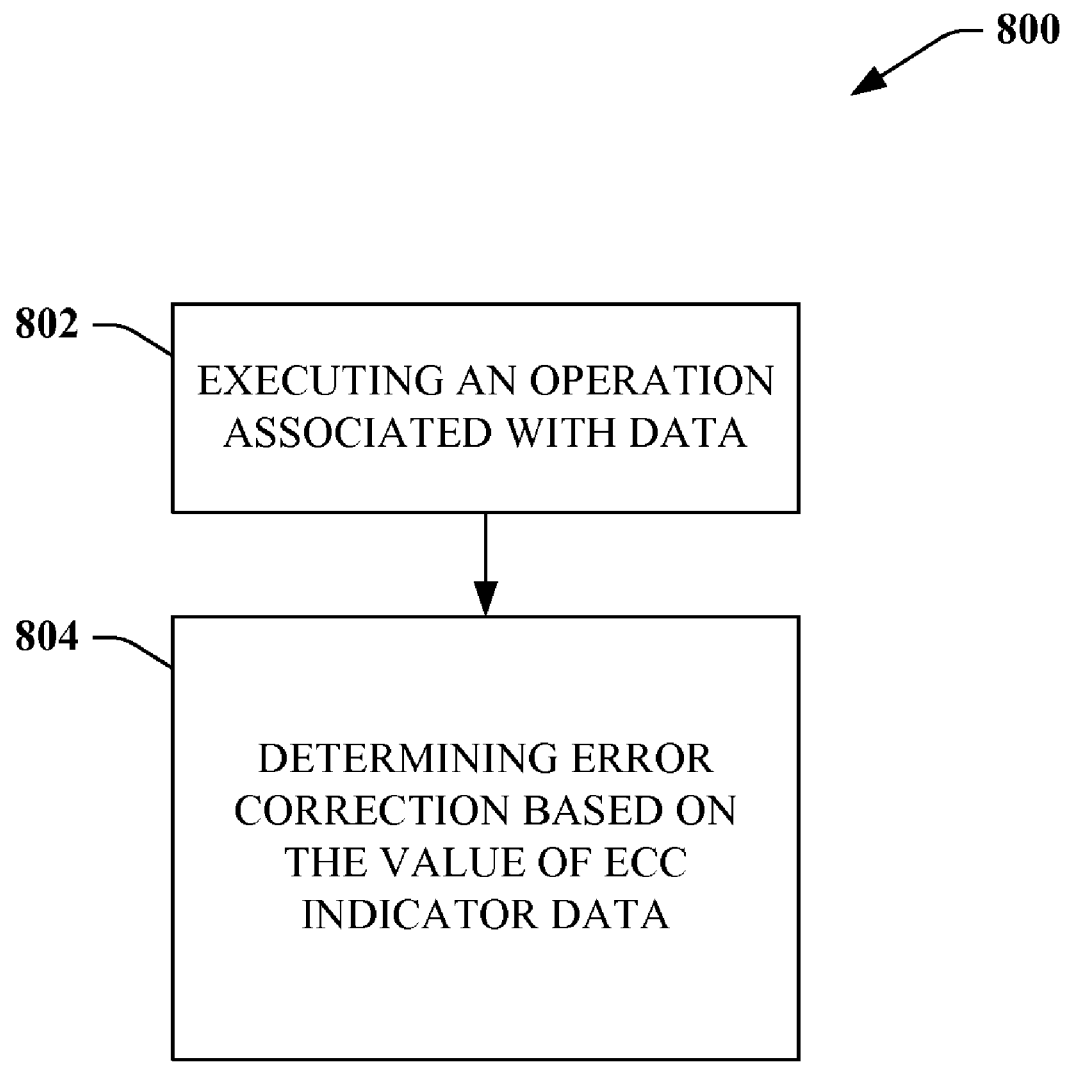
FIG. 8 illustrates a methodology that facilitates error correction of data in accordance with an aspect of the disclosed subject matter.

Referring to FIG. 8, a methodology 800 that can facilitate error correction of data in accordance with the disclosed subject matter is illustrated. At 802, an operation associated with a piece of data (e.g., data chunk, word of data, byte of data, bit of data, etc.) can be executed, for example, in a memory location(s) in a memory (e.g., flash memory). The operation can be programming data into, reading data from, or erasing data from a memory location(s) in the memory (e.g., 102). The programming operation can include, for example, write buffer programming or word/byte programming.

At 804, a determination regarding error correction of the piece of data can be made based on the value of ECC indicator data. In one aspect, an ECC control component can facilitate making such determinations. In accordance with another aspect of the disclosed subject matter, during a write buffer programming operation to program a chunk of data into a memory location(s) in the memory, a determination can be as to whether the error correction is enabled or disabled based on indicator data associated with the memory location(s). For example, if the indicator data shows that new parity code cannot be written for data stored, or incoming data to be stored, in the memory location(s), then a determination can be made to disable error correction with regard to the data being written to the memory location. For example, an indicator bit can be set in a programmed state (e.g., indicator bit can have a value of '0' in a flash memory) to facilitate disabling error correction with respect to the associated data. If the indicator data shows that parity code can be written for the incoming data, as well as the stored data, in the memory location(s), then a determination can be made to enable error correction with regard to the data being written to the memory location. For example, an indicator bit can be set or can remain in an unprogrammed state (e.g., indicator bit can have a value of '1' in a flash memory) to facilitate enabling error correction with respect to the associated data.

In accordance with yet another aspect of the disclosed subject matter, during a read operation to read data from a memory location in memory, a determination can be made regarding whether error correction is enabled with respect to the data being read from the memory location, where the determination can be based on the value of the indicator data associated with the data. For example, if an indicator bit associated with the data is unprogrammed (e.g., set to '1') then it can be determined that error correction is enabled with respect to the data. As a result, error correction can be performed to facilitate accurate decoding of the data, and the decoded data, as error corrected, can be provided as an output. If the indicator bit associated with the data is programmed (e.g., set to '0') then it can be determined that error correction is disabled with respect to the data. Based on this, no error correction is performed and the true data that was stored in the memory location can be decoded and provided as an output. At this point, methodology 800 can end.

Figure 9:
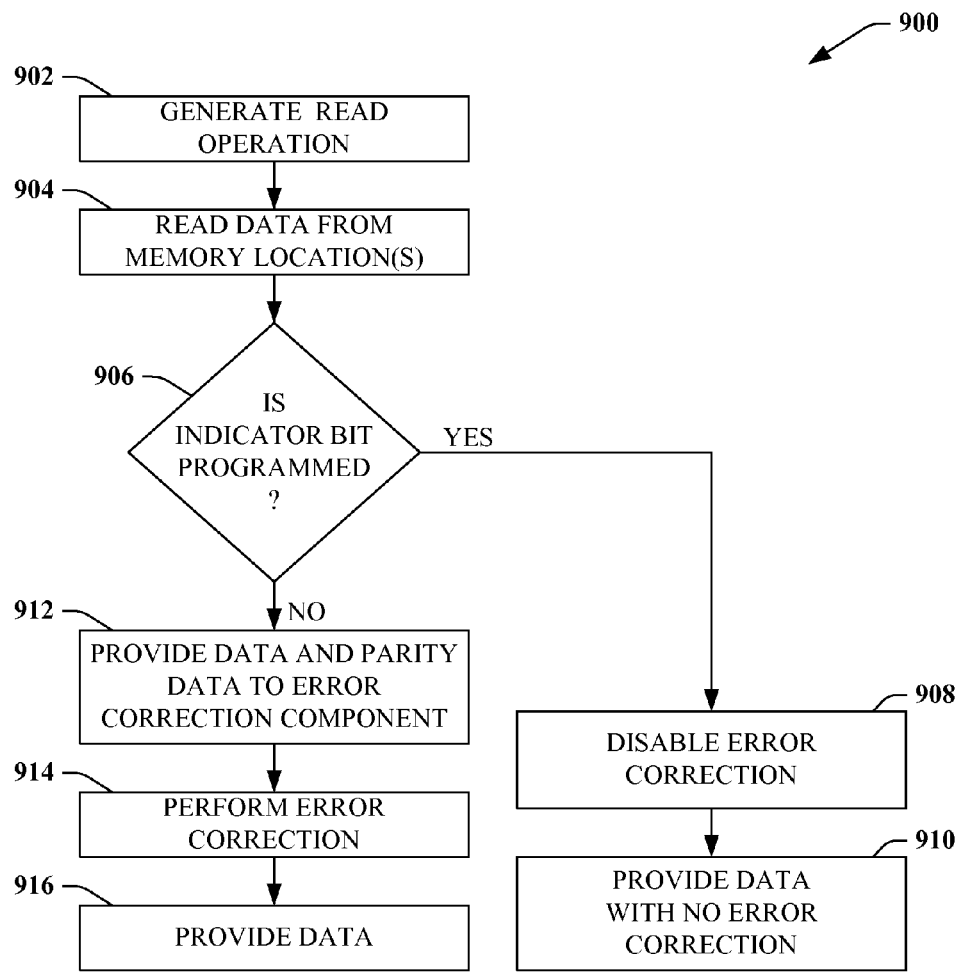
FIG. 9 depicts a methodology that facilitates error correction of data for a read operation in accordance with an aspect of the disclosed subject matter.

FIG. 9 depicts a methodology 900 that can facilitate error correction of data associated with a read operation in accordance with the disclosed subject matter. At 902, a read operation can be generated, for example, by a host processor (e.g., 202), to read data from a specified memory location(s) in a memory device (e.g., flash memory device). The read operation can include memory address information and/or other information to facilitate reading data from the desired memory location in the memory (e.g., 102). At 904, the data can be retrieved or read from the specified memory location (s). The data can include the data desired by the read operation as well as associated parity code and/or indicator bit data. At 906, a determination can be made as to whether the indicator bit is programmed (e.g., programmed to a '0' in flash memory) or not. If the indicator bit is programmed, then, at 908, error correction can be disabled. In accordance with one aspect, an ECC control component 108 can facilitate making the determination regarding whether the indicator bit is programmed and/or disabling the error correction with regard to the data. At 910, the read data can be provided with no error correction being performed on the data. The read data can be provided, for example, to a host processor, and/or a cryptographic component to be decrypted, and/or another component.

Turning back to reference numeral 906, if it is determined at 906 that the indicator bit is unprogrammed (e.g., indicator bit is set at '1' for a flash memory), then at 912, the data and parity code data can be provided to facilitate error detection. For example, the data and parity code data can be provided to an ECC component (e.g., 106). At 914, error correction can be performed on the data utilizing the parity code data. For example, the parity code data can be ECC (e.g., Hamming code) and can be utilized to facilitate error correction of the data. At 916, the data, as error corrected, can be provided as an output. For example, the data can be provided to a host processor, and/or a cryptographic component to be decrypted, and/or another component. At this point, methodology 900 can end.

Figure 10:
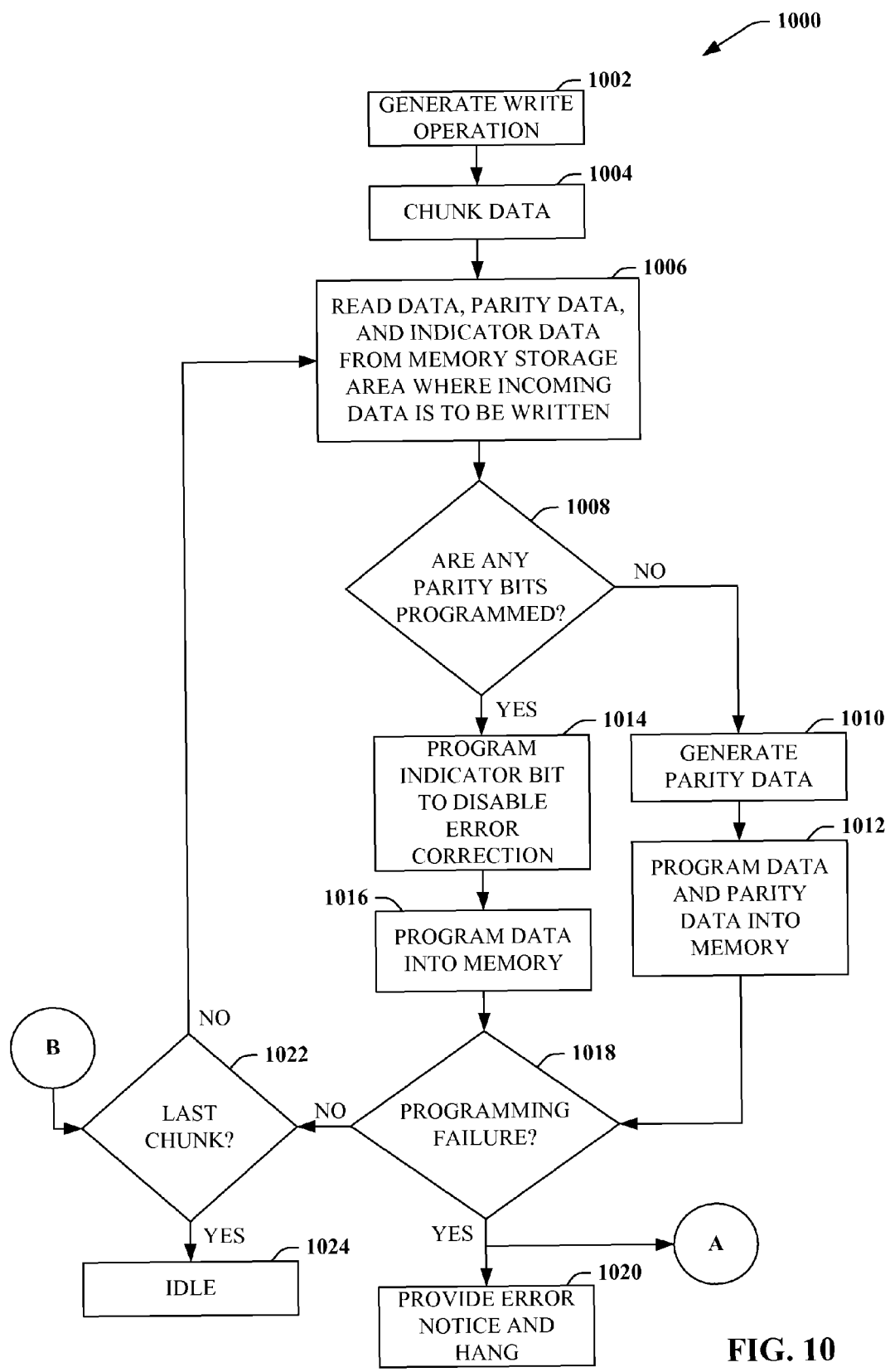
FIG. 10 illustrates a methodology that facilitates error correction of data for a program operation in accordance with the subject matter disclosed herein.

Turning to FIG. 10, illustrated is a methodology 1000 that can facilitate error correction of data in accordance with the disclosed subject matter is illustrated. At 1002, one or more write operations can be generated to facilitate writing data to a memory (e.g. 102). In accordance with one embodiment, the memory can be a flash memory (e.g. single-bit flash memory, multi-bit flash memory). The write operation(s) can be generated by a host processor (e.g., 202), for example. At 1004, data associated with the write operation(s) can be chunked such that the data can be in predetermined sets of data. For example, the data can be aligned into one or more data chunks of 128 bits or 256 bits. At 1006, data stored in a memory location can be read where the memory location can be the location where new data associated with the write operation is to be written. For example, a memory location associated with the write operation can already have data stored therein, while also still having portions of the memory location available for programming. As further example, the memory location can have four words of data stored therein, where the memory location can store a larger amount of data (e.g., 32 words, 64 words) and thus can have memory space available. The data read from the memory location can include the data chunk, associated parity code, and/or associated indicator data.

At 1008, a determination can be made as to whether one or more parity bits associated with the memory location are programmed (e.g., to a '0' state for flash memory) to facilitate determining whether a new parity code is to be written with regard to the data to be stored in the memory location. In accordance with one aspect, an ECC control component 108 can facilitate making such determinations. If it is determined that a new parity code can be written, such as, for example, if it is determined that none of the parity bits associated with the data chunk is programmed (e.g., to a '0'state) then, at 1010, parity code can be generated for the data to be stored in the memory location. For example, if 128 bits of data are to be stored in the memory location, then 8 bits of parity code can be generated; if 256 bits of data are to be stored in the memory location, then 9 bits of parity code can be generated. At 1012, the data and parity code can be programmed into the memory location, with the indicator bit remaining unprogrammed (e.g., set at '1') to facilitate enablement of error correction. Methodology 1000 can proceed to reference numeral 1018, to be discussed infra.

Turning back to reference numeral 1008, if it is determined that one or more parity bits are programmed to '0' in the memory location, then, at 1014, the indicator bit associated with the memory location and/or data chunk can be programmed to facilitate disabling error correction for the data to be stored in the memory location. For example, the indicator bit associated with the data can be programmed to a '0' for a flash memory. At 1016, the data can be programmed into the desired memory location, with error correction disabled. At 1018, a determination can be made as to whether the programming of the data into the memory location was successful or a failure. If the programming operation was a failure, then, at 1020, a notice of the programming error can be provided, for example, to the host processor, and the memory device can hang. In accordance with one embodiment of the disclosed subject matter, if, at 1018, it is determined that the programming operation is a failure, then the methodology 1000 can proceed to point A, where additional processes can be employed as discussed infra with regard to FIG. 11 and methodology 1100.

If, at 1018, it is determined that the programming of the data was successful, then at 1022, it can be determined whether there is any other data to be programmed into the memory. If it is determined that there is more data (e.g. data chunks) to be programmed into the memory, then methodology 1000 can be returned to reference numeral 1006 to continue programming of data into the memory. If, at 1022, it is determined that there are no more chunks of data to be programmed into the memory, then, at 1024, the memory device can be idle. Note that point B is associated with reference numeral 1022. Point B is discussed infra with regard to FIG. 11 and methodology 1100. At this point, methodology 1000 can end.

Figure 11:
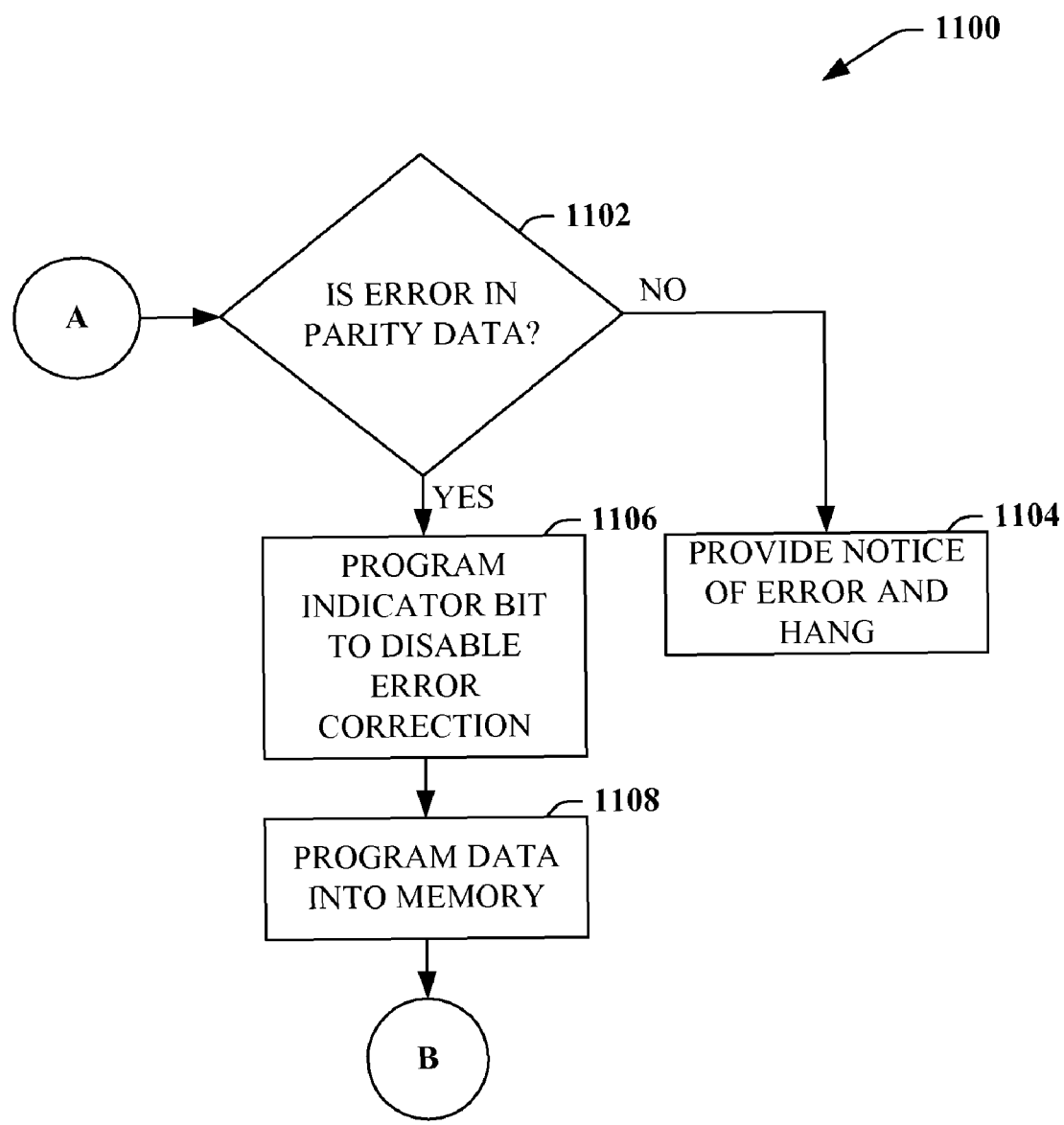
FIG. 11 depicts a methodology that facilitates programming of data in accordance with the disclosed subject matter.

Referring to FIG. 11, illustrated is a methodology 1100 that facilitates programming of data in accordance with the disclosed subject matter. Methodology 1100 can proceed from point A, for example, point A of methodology 1000. Thus, for example, at point A it can already be determined that a programming failure has occurred. At 1102, a determination can be made regarding whether the programming occurred with regard to the parity data only. If it is determined that a programming error did not occur with regard to the parity data only, such as where the programming error occurred with respect to the data chunk or both the data chunk and the parity data, then, at 1104, an error notice can be provided and the memory device can hang. If, at 1102, it is determined that a programming error related to the parity data did occur (and no programming error occurred with regard to the data chunk), then at 1106, the indicator bit associated with the data chunk can be programmed (e.g., programmed to '0') to facilitate disabling error correction as to the associated data chunk. In one aspect, the ECC control component 108 can facilitate disabling error correction. At 1108, the data chunk can be programmed into the memory location(s) in memory with the error correction disabled with respect to that data chunk. At this point, methodology 1100 can proceed to point B, where further processes can be performed, for example, as described with regard point B in methodology 1000 and FIG. 10. For example, after the data is programmed into memory at 1108, the methodology 1100 can proceed to point B, where point B can proceed to reference numeral 1022 in methodology 1000 to determine whether there are any other chunks of data to be programmed into the memory with regard to the write operation; if it is the last chunk of data, the memory device can idle (e.g., reference numeral 1024), if there is another data chunk(s) to be programmed, then the programming processes can continue (e.g., return to reference numeral 1006). At this point, methodology 1100 can end.

Figure 12:
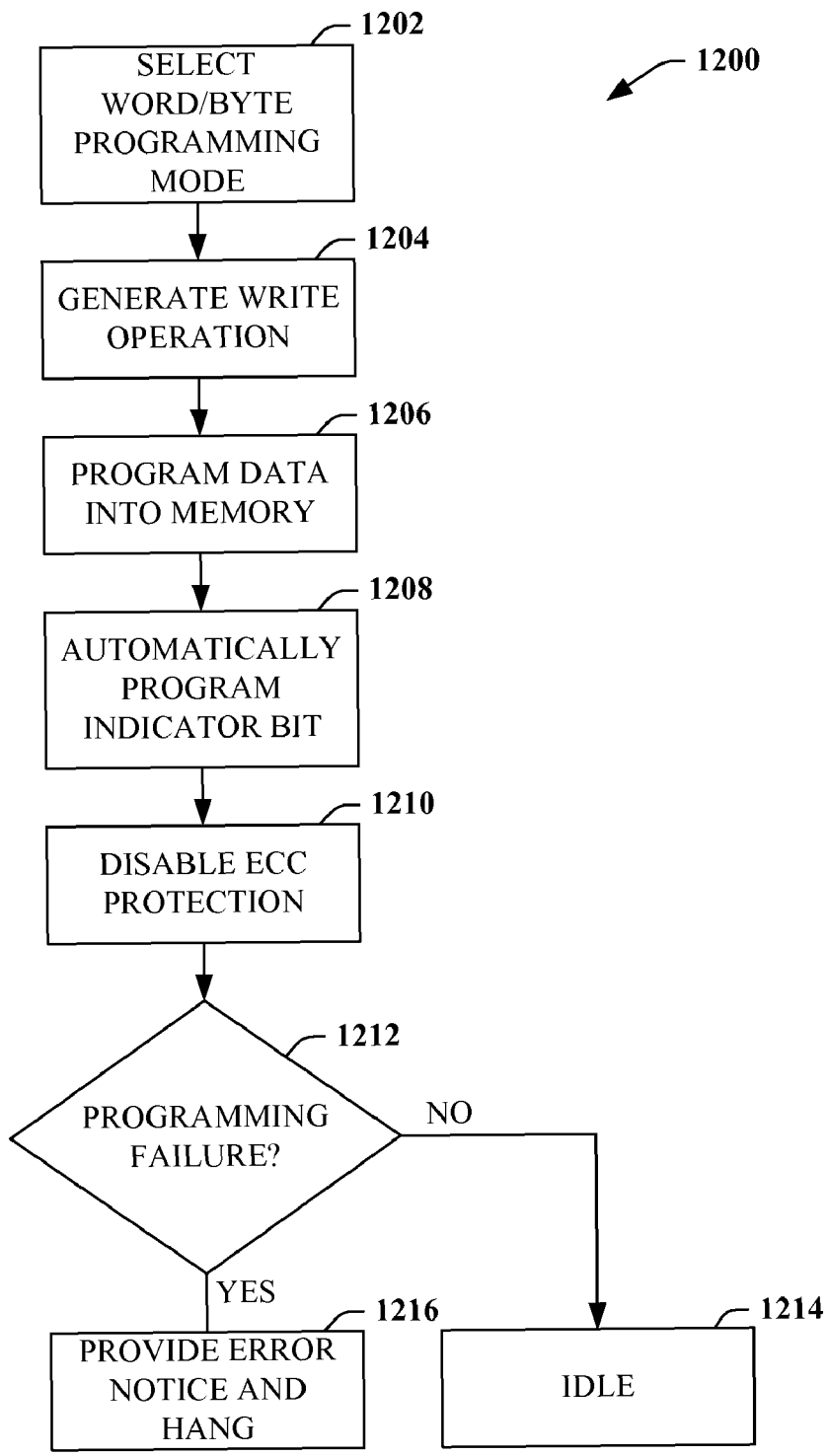
FIG. 12 illustrates a methodology that facilitates programming of data for a word/byte programming operation in accordance with the disclosed subject matter.

Turning to FIG. 12, depicted is a methodology 1200 that can facilitate programming data in accordance with the disclosed subject matter. At 1202, the word/byte programming mode can be selected. For example, a user can select the word/byte programming mode to facilitate writing a piece of data, which can be a relatively small amount of data (e.g., 8 bits, 16 bits, etc.), to a desired memory location in a memory array (e.g., 104) in the memory (e.g. 102). At 1204, a program operation (e.g., word/byte programming operation) can be generated, for example, by a host processor (e.g., 202). The program operation can specify the memory location to which the piece of data can be written. At 1206, the piece of data can be programmed into the desired memory location. At 1208, the indicator bit associated with the piece of data and/or desired memory location can be programmed automatically to facilitate disabling error correction with regard to that piece of data. At 1210, error correction for such piece of data can be disabled, for example, by the ECC control component (e.g., 108).

At 1212, a determination can be made regarding whether a programming error occurred. If it is determined that no programming error occurred and the programming was successful, then, at 1214, the memory device can idle. If, at 1212, it is determined that a programming error occurred while programming the piece of data, then, at 1216, a notice of the programming error can be provided, for example, to the host processor, and the memory device can hang. At this point, methodology 1200 can end.

Figure 13:
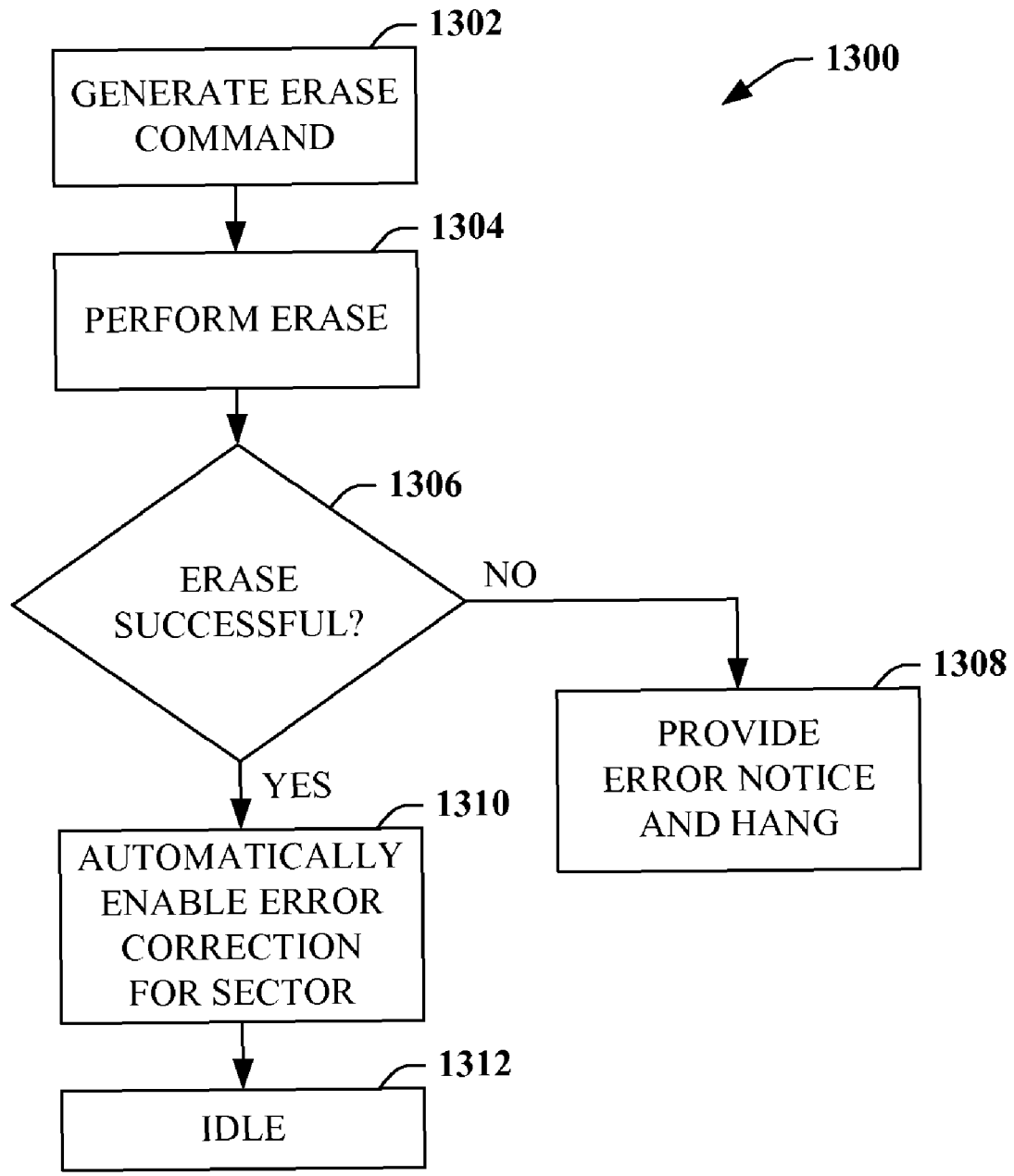
FIG. 13 illustrates a methodology that facilitates enabling error correction of data as part of an erase operation in accordance with the disclosed subject matter.

Turning to FIG. 13, depicted is a methodology 1300 that can facilitate programming data to a memory in accordance with the disclosed subject matter. At 1302, an erase command can be generated, for example, by a host processor (e.g., 202). The erase command can include information to specify which memory location(s) in the memory (e.g., 102) is to be erased. In accordance with one embodiment of the disclosed subject matter, the memory can be a flash memory (e.g., NOR flash memory). For example, when erasing data in a flash memory device, an erase command can specify a block or sector of a memory array (e.g., 104) in the memory to be erased, where the block of memory can include a plurality of memory locations. At 1304, data in the memory location(s) specified in the erase command can be erased and/or removed from the memory location(s).

At 1306, a determination can be made as to whether the erase operation was successful to erase data from the memory location(s) specified in the erase command. If the erase was not successful, then, at 1308, a notice of the erase error can be provided and the memory device can hang. If, at 1306, it is determined that the erase is successful to erase the data from the desired memory location(s), then, at 1310, error correction is automatically enabled for the memory location(s). For example, in a flash memory device, an erase of a block or sector of the memory array can result in each bit in the block or sector being set to an unprogrammed state of '1'. For one data chunk (e.g., 128 bits of data, 256 bits of data) that can be associated with a given memory location (e.g., memory cell) in such block or sector, one bit can be employed as an indicator bit to facilitate enabling or disabling error correction with regard to such data chunk. When the indicator bit is in the unprogrammed state (e.g., set as '1' in a flash memory device), error correction can be enabled with regard to that data chunk associated with that memory location. At 1312, the memory device can idle. At this point, methodology 1300 can end.

The disclosed subject matter can facilitate error correction on data, such as data read from a memory, such as, for example, flash memory (e.g., NOR flash memory), while maintaining legacy or previous NOR flash memory write operations, such as byte/word programming. The disclosed subject matter can also facilitate grafting the ECC algorithm, as more fully described herein, onto existing an NOR-flash-memory write-buffer-programming command, and can thereby render the ECC protection scheme transparent to the user and facilitate allowing a seamless migration from conventional NOR flash memory products to NOR flash memory products that can provide ECC protection of data.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone, watch), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates error correction of data in a non-volatile memory, comprising:
    an error correction code (ECC) component that generates at least one parity bit comprising a value based on a first set of data being written to a portion of the non-volatile memory, wherein the portion of the non-volatile memory comprises a second set of data stored thereon that is in addition to the first set of data;
    an evaluation component that analyzes at least one of the second set of data, a stored parity code associated with the second set of data, and a stored indicator data associated with the second set of data, wherein the stored parity code and the stored indicator data are located in the portion of the non-volatile memory;
    an indicator component that sets an indicator data associated with the first set of data as a function of the at least one parity bit and the analysis performed by the evaluation component; and
    a controller component that, when the first set of data is being read from the non-volatile memory, facilitates enabling or disabling error correction of the first set of data based on the indicator data and communicates, to other system components, information related to an error detection and correction status of the first set of data;
    wherein the non-volatile memory includes a plurality of memory locations, wherein at least one of data, a parity code, or indicator data, or a combination thereof, is written to, read from, or stored in, at least one memory location of the plurality of the memory locations.

2. The system of claim 1, the non-volatile memory is comprised of at least one of a NOR flash memory or a NAND flash memory, or a combination thereof.

3. The system of claim 1, the indicator data is comprised of at least one indicator bit, the indicator component allows the at least one indicator bit to remain unprogrammed to enable error correction of data associated with the at least one indicator bit and facilitates a program of the at least one indicator bit to disable error correction of the data associated with the at least one indicator bit.

4. The system of claim 3, during a read operation, the controller component analyzes at least one of the data, the parity code, or the indicator data, or a combination thereof, and enables error correction of the data when the at least one indicator bit is unprogrammed and disables error correction of the data when the at least one indicator bit is programmed.

5. The system of claim 3, during a write buffer program operation, the controller component analyzes at least one of data, parity code, or indicator data, or a combination thereof, associated with a memory location in which data associated with the write buffer program operation is to be stored, and enables error correction of the data when the at least one indicator bit is unprogrammed and bits associated with the parity code are all unprogrammed, and disables error correction of the data when the at least one indicator bit is programmed or at least one bit associated with the parity code is programmed.

6. The system of claim 1, further comprising a program component that facilitates at least one of write buffer program of data or word/byte program of data, or a combination thereof, the program component aligns data into data chunks of a predetermined number of bits when data is programmed in a write buffer program mode, wherein each data chunk is associated with a parity code or indicator bit.

7. The system of claim 6, the controller component disables error correction when the program component is in a word/byte program mode.

8. The system of claim 1, the controller component enables error correction associated with a memory location that is erased.

9. The system of claim 1, further comprising:
a host processor that facilitates execution of operations on data; and
a cryptographic component that receives data from at least one of the host processor or the non-volatile memory, or a combination thereof, the cryptographic component facilitates at least one of encryption or decryption of the data.

10. An electronic device comprising the system of claim 1, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with motor vehicles, a global positioning satellite (GPS) unit, an electronic device associated with an airplane, an electronic device associated with an industrial control system, a Hardware Security Module (HSM), a set-top box, a secure memory device with computational capabilities, or an electronic device with a tamper-resistant chip.

11. A method that facilitates error correction of data, comprising:
generating at least one parity bit based on data being programmed into a non-volatile memory location, wherein the non-volatile memory location comprises stored data that is in addition to the data being programmed;
executing an operation in a non-volatile memory associated with the data being programmed or the stored data, the operation is at least one of a read, a program, a write buffer program, a word/byte program, or an erase; and
at least one of enabling error correction or disabling error correction of the data being programmed or the stored data based on a value of a first indicator data associated with the data being programmed, at least one parity bit associated with the data being programmed, a second indicator data associated with the stored data, or a parity bit associated with the stored data.

12. The method of claim 11, further comprising:
generating a read operation that specifies a memory location in the non-volatile memory;
reading at least one of data, parity data, and indicator data, or a combination thereof, from the memory location, the indicator data is comprised of an indicator bit;
determining if the indicator bit is programmed; and
at least one of:
disabling error correction of the data if the indicator bit is programmed, and
providing the data, or
enabling error correction of the data if the indicator bit is unprogrammed,
providing the data and the parity data for error correction,
performing error correction of the data, and
providing the data after error correction is performed.

13. The method of claim 11, further comprising:
selecting a word/byte programming mode;
generating a word/byte operation that specifies a memory location in the non-volatile memory to which data is to be written;
programming the data associated with the word/byte operation in the memory location;
automatically programming an indicator bit associated with the memory location; and
disabling error correction with regard to the data.

14. The method of claim 11, further comprising:
aligning data into data chunks of a predetermined number of bits, the operation is a write buffer program operation;
associating each data chunk with a parity code or an indicator bit;
reading at least one of data, parity data, or indicator data, or a combination thereof, associated with a memory location in the non-volatile memory specified by the write buffer program operation;
analyzing the at least one of data, parity data, or indicator data, or a combination thereof; and
determining at least one of enabling error correction or disabling error correction based on at least one of the parity data or the indicator data, or a combination thereof.

15. The method of claim 14, further comprising:
enabling error correction associated with the data that is associated with the write buffer program operation, wherein the parity data and the indicator data associated with the memory location are unprogrammed and error correction is enabled with regard to the memory location;
generating parity data associated with the data that is associated with the write buffer program operation;

programming the data and the parity data associated with the write buffer program operation into the memory location.

16. The method of claim 15, further comprising:

determining if a programming failure occurred;

determining if the programming error occurred in the data when it is determined that a programming failure occurred;

determining if the programming error occurred in the parity data when it is determined that a programming failure occurred;

programming an indicator bit associated with the indicator data when a programming failure occurs if it is determined that the programming failure is based on an error associated with the programming of the parity data, and there is no error related to the programming of the data;

disabling error correction related to the data; and programming the data into the memory location in the non-volatile memory.

17. The method of claim 14, further comprising:

programming the indicator bit to disable error correction with regard to the data associated with the write buffer program operation, wherein at least one of a bit associated with the parity data that is associated with the memory location or a bit associated with the indicator data that is associated with the memory location is programmed and error correction is disabled with regard to the memory location; and programming the data associated with the write buffer program operation into the memory location.

18. The method of claim 11, further comprising:

erasing a memory location in the non-volatile memory, the operation is an erase operation;

enabling error correction with regard to the memory location.

19. A system that facilitates error correction of data, comprising:

means for executing an operation related to data in a non-volatile memory, wherein the data comprises stored data and additional data programmed to the non-volatile memory; and means for at least one of enabling error correction or disabling error correction of the data based on:

a value of a first indicator bit associated with the stored data and a value of a second indicator bit associated with the additional data programmed to the non-volatile memory; and a value of a first parity bit associated with the stored data and a second parity bit associated with the additional data programmed to the non-volatile memory.

20. The system of claim 19, further comprising:

means for analyzing at least one of the data, the first parity code, the second parity code, the value of the first indicator bit, or a value of the second indicator bit, or a combination thereof;

means for performing error correction of the data;

means for encoding the data; and means for decoding the data.

* * * * *